US008855717B2

United States Patent
Takahashi et al.

(10) Patent No.: US 8,855,717 B2
(45) Date of Patent: Oct. 7, 2014

(54) RADIO BASE STATION AND RADIO NETWORK CONTROLLER

(75) Inventors: Hideaki Takahashi, Tokyo (JP); Wuri Andarmawanti Hapsari, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 134 days.

(21) Appl. No.: 13/578,759

(22) PCT Filed: Feb. 10, 2011

(86) PCT No.: PCT/JP2011/052936
§ 371 (c)(1),
(2), (4) Date: Oct. 16, 2012

(87) PCT Pub. No.: WO2011/099582
PCT Pub. Date: Aug. 18, 2011

(65) Prior Publication Data
US 2013/0029727 A1    Jan. 31, 2013

(30) Foreign Application Priority Data
Feb. 12, 2010   (JP) ................................. 2010-029503

(51) Int. Cl.
*H04W 88/08*  (2009.01)
*H04W 88/02*  (2009.01)
*H04W 92/02*  (2009.01)

(52) U.S. Cl.
CPC .............. *H04W 88/08* (2013.01); *H04W 92/02* (2013.01)
USPC ........................................ 455/561; 455/550.1

(58) Field of Classification Search
USPC ................ 455/418, 422.1, 432.1–443, 550.1, 455/552.1, 561
See application file for complete search history.

(56) References Cited

FOREIGN PATENT DOCUMENTS

JP         2004-535108 A    11/2004
WO         02/093946 A2     11/2002

OTHER PUBLICATIONS

Nokia Siemens Networks, et al., "Exchanging cell load information between RATs by RIM procedure," 3GPP TSG-RAN WG3 Meeting #66, R3-093341, Nov. 8-13, 2009 (13 pages).
3GPP TS 25.413 V9.1.0, "3rd Generation Partnership Project; Technical Specification Group Radio Access Network; UTRAN Iu interface Radio Access Network Application Part (RANAP) signalling (Release 9)," Dec. 2009, pp. 79-80, 129-130, 203, 228 (7 pages).
3GPP TS 48.018 V10.6.0, "3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 10)," May 2012 (184 pages).
Ericsson, "HO-based IRAT Load Balancing signalling," 3GPP TSG-RAN3 Meeting #66bis, R3-100361, Jan. 18-22, 2010 (23 pages).

(Continued)

*Primary Examiner* — Kashif Siddiqui
(74) *Attorney, Agent, or Firm* — Osha Liang LLP

(57) ABSTRACT

A radio base station eNB according to the present invention is provided with: a generation unit 12 configured to generate "eNB DIRECT INFORMATION TRANSFER (a message for information transfer)" including an information element "Inter-system Information Transfer Type" to which either one of a first information element "RIM Transfer" including first radio information requested in GERAN and a first forwarding address destined for the GERAN, or a second information element "SON information transfer for E-UTRAN-UTRAN" including second radio information requested in UTRAN and a second forwarding address destined for the UTRAN can be set.

6 Claims, 13 Drawing Sheets

(56) References Cited

OTHER PUBLICATIONS

3GPP TS 36.300 V11.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," Jun. 2012 (201 pages).

International Search Report issued in PCT/JP2011/052936, mailed on Mar. 29, 2011, with translation (2 pages).

FIG. 3

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Inter-system Information Transfer Type | M | | 9.2.1.55 | | YES | ignore |

FIG. 4

| IE/Group Name | Presence | Range | IE type and reference | Semantics description |
|---|---|---|---|---|
| Choice Inter-system Information Transfer Type | | | | |
| >RIM Transfer | | | 9.2.3.23 | |
| >SON FOR E-UTRAN-UTRAN information transfer | | | | |

| IE/Group Name | Presence | Range | IE type and reference | Semantics description |
|---|---|---|---|---|
| SON FOR E-UTRAN-UTRAN Information Transfer | | | | |
| >SON FOR E-UTRAN-UTRAN Information Type | | | | |
| >SON FOR E-UTRAN-UTRAN Information Transfer Routing Address | | | | |

FIG. 5

| IE/Group Name | Presence | Range | IE type and reference | Semantics description |
|---|---|---|---|---|
| SON INFORMATION TYPE FOR CHOICE E-UTRAN-UTRAN Information Type | | | | |
| >MLB information transfer | | | | LOAD INFORMATION RELATING TO MOBILITY LOAD BALANCING (EXAMPLE: COMPOSITE AVAILABLE CAPACITY GROUP) |
| >MRO information transfer | | | | INFORMATION NEEDED TO PERFORM MOBILITY ROBUSTNESS OPTIMIZATION |
| >energy saving information transfer | | | | INFORMATION NEEDED TO PERFORM ENERGY SAVING |
| >... | | | | (IE ADDED IN EXTENSION IN THE FUTURE) |

FIG. 6

| IE/Group Name | Presence | Range | IE type and reference | Semantics description | Criticality | Assigned Criticality |
|---|---|---|---|---|---|---|
| >Target RNC-ID | | | | | | |
| >>LAI | M | | 9.2.3.1 | | | |
| >>RAC | O | | 9.2.3.2 | | | |
| >>RNC-ID | M | | INTEGER(0..4095) | | | |
| >>Extended RNC-ID | O | | 9.2.1.14 | | | |

FIG. 8

| Information elements | P | Condition/comment | IE Type | Ins. |
|---|---|---|---|---|
| SON INFORMATION TRANSFER FOR E-UTRAN-UTRAN | M | MME DIRECTLY ENTERS SON INFORMATION TRANSFER FOR E-UTRAN-UTRAN SENT BY ENE DIRECT TRANSFER MESSAGE FROM eNB<br><br>CN (SGSN) DIRECTLY ENTERS SON INFORMATION TRANSFER FOR E-UTRAN-UTRAN SENT BY DIRECT TRANSFER MESSAGE FROM RNC | F-Container | 0 |
| SON INFORMATION TRANSFER ROUTING ADDRESS FOR E-UTRAN-UTRAN | C | MME DIRECTLY ENTERS SON INFORMATION TRANSFER ROUTING ADDRESS FOR E-UTRAN-UTRAN SENT BY ENE DIRECT TRANSFER MESSAGE FROM eENB<br><br>CN (SGSN) DIRECTLY ENTERS SON INFORMATION TRANSFER ROUTING ADDRESS FOR E-UTRAN-UTRAN SENT BY DIRECT TRANSFER MESSAGE FROM RNC | Target Identification | 0 |
| Private Extension | O | None | Private Extension | VS |

FIG. 9

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| NAS-PDU | M | | 9.2.3.5 | | YES | ignore |
| LAI | O | | 9.2.3.6 | | YES | ignore |
| RAC | O | | 9.2.3.7 | | YES | ignore |
| SAI | O | | 9.2.3.9 | | YES | ignore |
| SAPI | O | | 9.2.3.8 | | YES | ignore |
| Redirection Indication | O | | 9.2.3.36 | | YES | ignore |
| Redirection Completed | O | | 9.2.3.35 | | YES | ignore |
| Subscriber Profile ID for RAT/Frequency priority | O | | 9.2.1.86 | | YES | ignore |

FIG. 11

| IE/Group Name | Presence | Range | IE type and reference | Semantics description | Criticality | Assigned Criticality |
|---|---|---|---|---|---|---|
| >Target eNB-ID | | | | | | |
| >>PLMN identity | M | | OCTET STRING(SIZE(3)) | | | |
| >>CHOICE eNB ID | | | | | | |
| >>>Macro eNB ID | | | BIT STRING(20) | | – | |
| >>>Home eNB ID | | | BIT STRING(28) | | – | |
| >>Selected TAI | M | | 9.2.1.30C | | | |

FIG. 12

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Inter-system Information Transfer Type | M | | 9.2.1.55 | | YES | ignore |

FIG. 13

| Information elements | P | Condition/comment | IE Type | Ins. |
|---|---|---|---|---|
| CHOICE{SON INFORMATION TRANSFER FOR BSS CONTAINER OR E-UTRAN-UTRAN | M | MADE TO SELECT TO EITHER SEND INFORMATION FOR EXISTING RIM (BSS CONTAINER) OR SEND SON INFORMATION TRANSFER FOR E-UTRAN-UTRAN | F-Container | 0 |
| CHOICE{RIM ROUTING ADDRESS OR SON INFORMATION TRANSFER ROUTING ADDRESS FOR E-UTRAN-UTRAN | C | MADE TO SELECT TO EITHER SEND ROUTING ADDRESS (RIM ROUTING ADDRESS) FOR SENDING INFORMATION FOR EXISTING RIM OR ROUTING ADDRESS FOR SON INFORMATION TRANSFER FOR E-UTRAN-UTRAN | Target Identification | 0 |
| Private Extension | O | None | Private Extension | VS |

RADIO BASE STATION AND RADIO NETWORK CONTROLLER

TECHNICAL FIELD

The present invention relates to a radio base station and a radio network controller.

BACKGROUND ART

Presently, with the RAN3 of the 3GPP, the exchange of Load Information between different RATs (Radio Access Technologies) is being studied as a function of "SON (Self Configuration and Self Organization)".

Methods being studied for exchanging load information between different RATs include a first method for using "RIM (RAN Information Transfer)" as defined for exchanging information between GERAN and another RAT, and a second method for using signaling in an Inter-RAT handover.

SUMMARY OF INVENTION

Technical Problem

However, the RIM, which is being studied for use in the first method, has been defined with the objective of information exchange between E-UTRAN (Evolved Universal Terrestrial Radio Access Network) and GERAN (GSM EDGE Radio Access Network), and between UTRAN and GERAN; at the present point in time, a problem is presented in that application to information exchange between E-UTRAN and UTRAN is not possible.

Specifically, in order to employ the RIM for information exchange between E-UTRAN and UTRAN, it is necessary to apply changes also to the specification for GERAN, which is not preferable.

Further, with the second method, where Inter-RAT handovers occur at a low frequency, the frequency of information exchange between E-UTRAN and UTRAN is also low, and a problem is presented in that the latest load information cannot be acquired in E-UTRAN and UTRAN.

Therefore, the present invention has been achieved in view of the above-described problems, and an object thereof is to provide a radio base station and a radio network controller making it possible to exchange load information appropriately between E-UTRAN and UTRAN without the need to apply changes to the specification for GERAN.

Solution to Problem

A first characteristic of the present embodiment is summarized in that a radio base station, located within E-UTRAN, comprising a generation unit configured to generate a message for information transfer including an information element to which either one of a first information element including first radio information requested in GERAN and a first forwarding address destined for the GERAN, or a second information element including second radio information requested in UTRAN and a second forwarding address destined for the UTRAN can be set, and a transmission unit configured to transmit, to the GERAN, the message for information transfer in which the first information element has been set to the information element, and to transmit, to the UTRAN, the message for information transfer in which the second information element has been set to the information element in which the type of the first radio information which can be set in the first information element and the type of the second radio information which can be set in the second information element can be changed separately.

A second characteristic of the present embodiment is summarized in that a radio network controller, located within UTRAN, comprising, a generation unit configured to generate a message for information transfer including an information element to which either one of a first information element including first radio information requested in GERAN and a first forwarding address destined for the GERAN, or a second information element including second radio information requested in E-UTRAN and a second forwarding address destined for the E-UTRAN can be set, and a transmission unit configured to transmit, to the GERAN, the message for information transfer in which the first information element has been set to the information element, and to transmit, to the E-UTRAN, the message for information transfer in which the second information element has been set to the information element in which the type of the first radio information which can be set in the first information element and the type of the second radio information which can be set in the second information element can be changed separately.

Advantageous Effects of Invention

As has been described above, according to the present invention, there can be provided a radio base station and a radio network controller making it possible to exchange load information appropriately between E-UTRAN and UTRAN without the need to apply changes to the specification for GERAN.

BRIEF DESCRIPTION OF DRAWINGS

FIG. 3 is a diagram illustrating an example of an information element within "eNB DIRECT INFORMATION TRANSFER" generated in the radio base station according to the first embodiment of the present invention.

FIG. 4 is a diagram illustrating an example of an information element "SON information transfer for E-UTRAN-UTRAN" within an information element "Inter-system Information Transfer Type" within "eNB DIRECT INFORMATION TRANSFER" generated in the radio base station according to the first embodiment of the present invention.

FIG. 5 is a diagram illustrating an example of an information element "SON information Type for E-UTRAN-UTRAN" within an information element "SON information transfer for E-UTRAN-UTRAN" within an information element "Inter system Information Transfer Type" within "eNB DIRECT INFORMATION TRANSFER" generated in the radio base station according to the first embodiment of the present invention.

FIG. 6 is a diagram illustrating an example of an information element "SON information transfer Routing Address for E-UTRAN-UTRAN" within an information element "SON information transfer for E-UTRAN-UTRAN" within an information element "Inter-system Information Transfer Type" within "eNB DIRECT INFORMATION TRANSFER" generated in the radio base station according to the first embodiment of the present invention.

FIG. 8 is a diagram illustrating an example of a method for transmitting the "SON information transfer for E-UTRAN-UTRAN" over GTPv2-C in the mobile communication system according to the first embodiment of the present invention.

FIG. 9 is a diagram illustrating an example of an information element within "DIRECT INFORMATION TRANSFER" transmitted over RANAP in the mobile communication system according to the first embodiment of the present invention.

FIG. 11 is a diagram illustrating an example of an information element "SON information transfer Routing Address for E-UTRAN-UTRAN" within an information element "SON information transfer for E-UTRAN-UTRAN" within an information element "Inter-system Information Transfer Type" within "DIRECT INFORMATION TRANSFER" generated in the radio base station according to the first embodiment of the present invention.

FIG. 12 is a diagram illustrating an example of an information element within "MME DIRECT INFORMATION TRANSFER" transmitted over S1 in the mobile communication system according to the first embodiment of the present invention.

FIG. 13 is a diagram illustrating an example of "RIM" transmitted in the mobile communication system according to the first modification of the present invention.

DESCRIPTION OF EMBODIMENTS (Mobile Communication System According to First Embodiment of the Present Invention)

A description will be provided for the mobile communication system according to a first embodiment of the present invention, with reference to FIG. 1 to FIG. 12.

Figure 1:
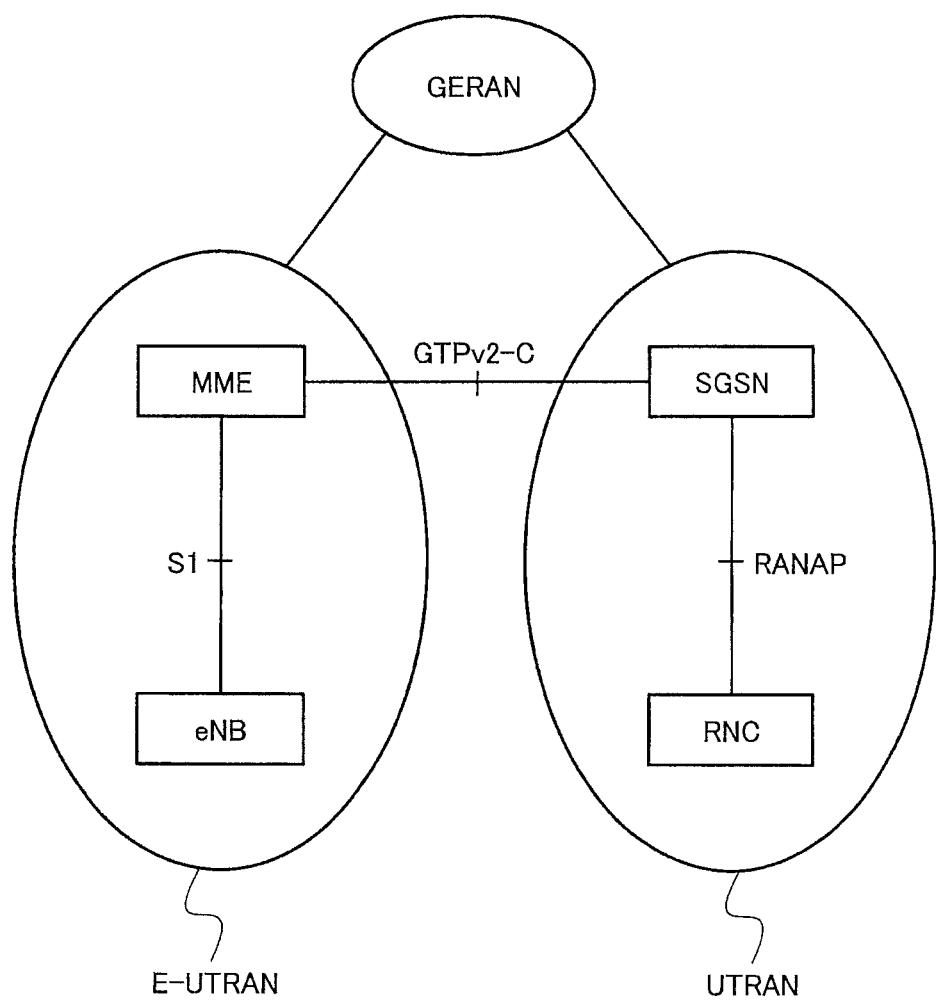
FIG. 1 is a diagram showing the entire configuration of a mobile communication system according to a first embodiment of the present invention.

The mobile communication system according to the present embodiment, as illustrated in FIG. 1, is configured to be provided with E-UTRAN, UTRAN, and GERAN.

Within the E-UTRAN, there are located a mobile switching center MME (Mobile Management Entity) and a radio base station eNB; within the UTRAN, there are located a mobile switching center SGSN (Serving GPRS Support Node) and a radio network controller RNC.

Herein, the mobile switching center MME and the radio base station eNB are connected via an S1 interface; the mobile switching center SGSN and the radio network controller RNC are connected via an RANAP (Radio Access Network Application Part) interface; and the mobile switching center MME and the mobile switching center SGSN are connected via a GTPv2-C interface.

Figure 2:
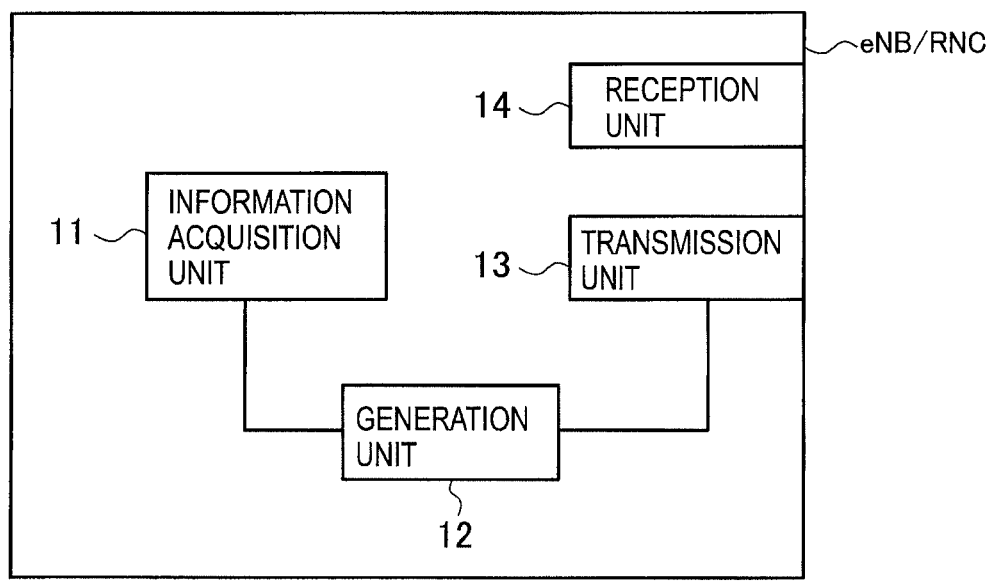
FIG. 2 is a functional block diagram of a radio base station and a radio network controller according to the first embodiment of the present invention.

As illustrated in FIG. 2, the radio base station eNB and the radio network controller RNC are provided with an information acquisition unit 11, a generation unit 12, a transmission unit 13, and a reception unit 14.

The information acquisition unit 11 is configured to acquire load information (for example, Compositive Available Capacity Group) relating to a previously-defined MLB (Mobility Load Balancing), information needed to perform MRO (Mobility Robustness Optimization), information needed to perform Energy Saving (information involved in energy saving), and the like.

The generation unit 12 of the radio base station eNB is configured to generate "eNB DIRECT INFORMATION TRANSFER". FIG. 3 illustrates an example of an information element within such "eNB DIRECT INFORMATION TRANSFER".

Specifically, as illustrated in FIG. 4, the generation unit 12 of the radio base station eNB is configured to set, within an information element "Inter-system Information Transfer Type" within the "eNB DIRECT INFORMATION TRANSFER", either one of a first information element "RIM Transfer" or a second information element "SON information transfer for E-UTRAN-UTRAN".

Herein, the generation unit 12 of the radio base station eNB is able to set, within the first information element "RIM Transfer", first radio information requested in the GERAN, a first forwarding address destined for the GERAN, and the like.

Meanwhile, the generation unit 12 of the radio base station eNB is able to set, within the second information element "SON information transfer for E-UTRAN-UTRAN", second radio information requested in the UTRAN, a second forwarding address destined for the UTRAN, and the like.

Specifically, as illustrated in FIG. 4, the generation unit 12 of the radio base station eNB is able to set the type of the second radio information requested in the UTRAN to an information element "SON information Type for E-UTRAN-UTRAN" within the second information element "SON information transfer for E-UTRAN-UTRAN", and is able to set the second forwarding address destined for the UTRAN to an information element "SON information transfer Routing Address for E-UTRAN-UTRAN" within the second information element "SON information transfer for E-UTRAN-UTRAN".

As illustrated in FIG. 5, as the above-described second radio information, the generation unit 12 of the radio base station eNB is able to set load information relating to the MLB within an information element "MLB information transfer" within the information element "SON information Type for E-UTRAN-UTRAN"; to set information needed to perform the MRO, within an information element "MRO information transfer" within the information element "SON information Type for E-UTRAN-UTRAN"; and to set information needed to perform the Energy Saving, within an information element "energy saving information transfer" within the information element "SON information Type for E-UTRAN-UTRAN".

An information element that can be set within the information element "SON information Type for E-UTRAN-UTRAN" can be extended in the future.

Further, as illustrated in FIG. 6, the generation unit 12 of the radio base station eNB is able to set identification information (LAI, RAC, RNC-ID, or the like) for the radio network controller RNC located in the UTRAN, to an information element "Target RNC-ID" within the information element "SON information transfer Routing Address for E-UTRAN-UTRAN".

The type of the first radio information that can be set within the first information element "RIM Transfer" and the type of the second radio information that can be set within the second information element "SON information transfer for E-UTRAN-UTRAN" can be changed separately.

Similarly, the generation unit 12 of the radio network controller RNC is configured to generate "DIRECT INFORMATION TRANSFER".

The transmission unit 13 of the radio base station eNB is configured to transmit, to the GERAN, the "eNB DIRECT INFORMATION TRANSFER" in which the first information element "RIM Transfer" has been set to the information element "Inter-system Information Transfer Type", and is configured to transmit, to the UTRAN, the "eNB DIRECT INFORMATION TRANSFER" in which the second information element "SON information transfer for E-UTRAN-UTRAN" has been set to the information element "Inter-system Information Transfer Type".

Similarly, the transmission unit 13 of the radio network controller RNC is configured to transmit, to the GERAN, the "DIRECT INFORMATION TRANSFER" in which the first information element "RIM Transfer" has been set to the information element "Inter-system Information Transfer Type", and is configured to transmit, to the E-UTRAN, the "DIRECT INFORMATION TRANSFER" in which the second information element "SON information transfer for E-UTRAN-UTRAN" has been set to the information element "Inter-system Information Transfer Type".

The reception unit 14 of the radio base station eNB is configured to receive the above-described first radio information transmitted from the radio network controller RNC, via "MME DIRECT INFORMATION TRANSFER" transmitted by the mobile switching center MME.

An operation by which predetermined information (the second radio information requested in the UTRAN) is transferred to the UTRAN from the E-UTRAN within the mobile communication system according to the present embodiment shall now be described below, with reference to FIG. 7 to FIG. 9.

Figure 7:
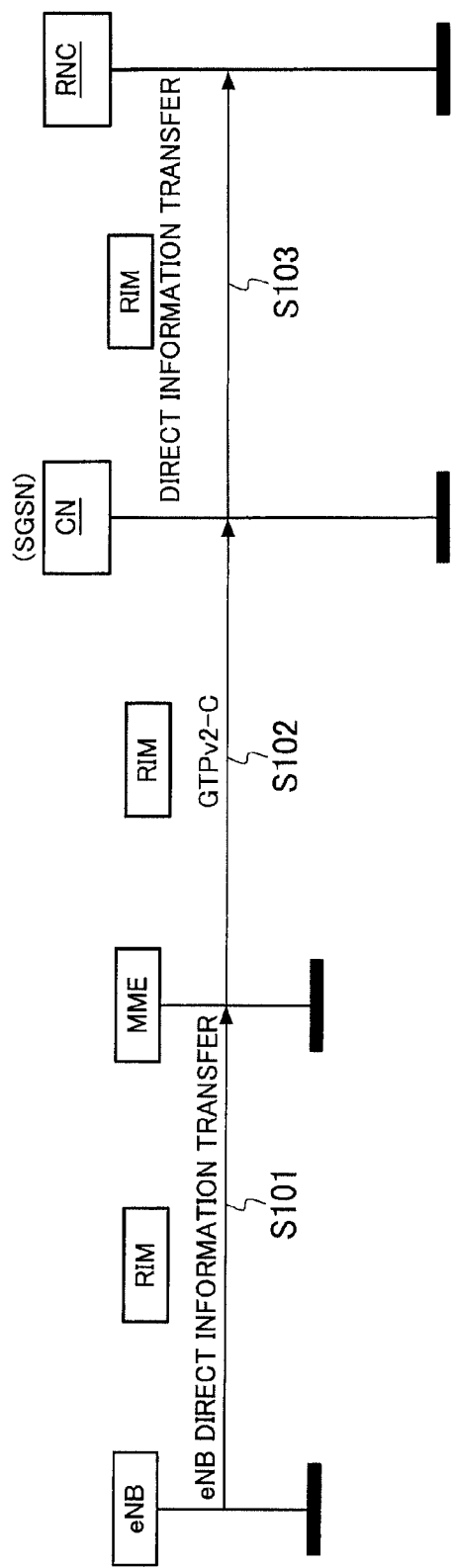
FIG. 7 is a sequence diagram illustrating an operation of the mobile communication system according to the first embodiment of the present invention.

As illustrated in FIG. 7, in step S101, the radio base station eNB generates the "eNB DIRECT INFORMATION TRANSFER" including the above-described second radio information, and transmits the same to the mobile switching center MME.

In step S102, the mobile switching center MME, maps the second information element "SON information transfer for E-UTRAN-UTRAN" included in the received "eNB DIRECT INFORMATION TRANSFER" onto the information element "SON information transfer for E-UTRAN-UTRAN" within a message in the GTPv2-C illustrated in FIG. 8, and maps the second information element "SON information transfer Routing Address for E-UTRAN-UTRAN" included in the received "eNB DIRECT INFORMATION TRANSFER" onto the information element "SON information transfer Routing Address for E-UTRAN-UTRAN" in the message in the GTPv2-C illustrated in FIG. 8, and transmits the same to the mobile switching center SGSN.

In step S103, the mobile switching center SGSN uses the "DIRECT INFORMATION TRANSFER", in which information elements as illustrated in FIG. 9 can be set, to notify the radio network controller RNC of the above-described second radio information.

Next, an operation by which predetermined information (the second radio information requested in the E-UTRAN) is transferred to the E-UTRAN from the UTRAN within the mobile communication system according to the present embodiment shall be described below, with reference to FIG. 10 to FIG. 12.

Figure 10:
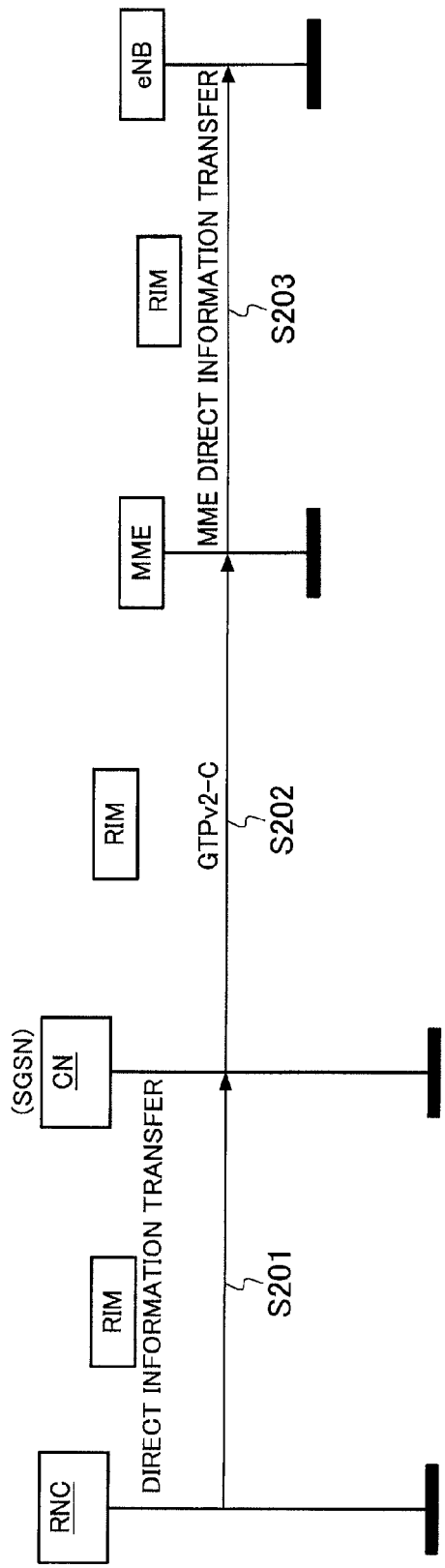
FIG. 10 is a sequence diagram illustrating an operation of the mobile communication system according to the first embodiment of the present invention.

As illustrated in FIG. 10, in step S201, the radio network controller RNC generates the "DIRECT INFORMATION TRANSFER" including the above-described second radio information, and transmits the same to the mobile switching center SGSN.

Herein, as illustrated in FIG. 11, the radio network controller RNC is able to set identification information (PLMN-ID, TAI, eNB-ID, or the like) for the radio base station eNB located in the E-UTRAN, to an information element "Target eNB-ID" within the "DIRECT INFORMATION TRANSFER".

In step S202, the mobile switching center SGSN, maps the second information element "SON information transfer for E-UTRAN-UTRAN" included in the received "DIRECT INFORMATION TRANSFER" onto the information element "SON information transfer for E-UTRAN-UTRAN" within a message in the GTPv2-C illustrated in FIG. 8, and maps the second information element "SON information transfer Routing Address for E-UTRAN-UTRAN" included in the received "DIRECT INFORMATION TRANSFER" onto the information element "SON information transfer Routing Address for E-UTRAN-UTRAN" in the message in the GTPv2-C illustrated in FIG. 8, and transmits the same to the mobile switching center MME.

In step S203, the mobile switching center MME uses the "MME DIRECT INFORMATION TRANSFER", in which information elements as illustrated in FIG. 12 can be set, to notify the radio base station eNB of the above-described second radio information.

(Operation and Effect of the Mobile Communication System According to the First Embodiment of the Present Invention)

In accordance with a mobile communication system according to the present embodiment, the existing "eNB DIRECT INFORMATION TRANSFER" and "DIRECT INFORMATION TRANSFER" can be used to thereby exchange load information appropriately between the E-UTRAN and the UTRAN, without the need to apply changes to the specification for the GERAN.

The characteristics of the present embodiment as described above may be expressed as follows.

A first characteristic of the present embodiment summarized in that a radio base station eNB located within E-UTRAN (a second radio access system), the radio base station eNB being provided with: a generation unit 12 configured to generate "eNB DIRECT INFORMATION TRANSFER" (a message for information transfer) including an information element "Inter-system Information Transfer Type" to which either one of a first information element "RIM Transfer" including first radio information requested in GERAN (a first radio access system) and a first forwarding address destined for the GERAN, or a second information element "SON information transfer for E-UTRAN-UTRAN" including second radio information requested in UTRAN and a second forwarding address destined for the UTRAN can be set; and a transmission unit 13 configured to transmit, to the GERAN, the "eNB DIRECT INFORMATION TRANSFER" in which the first information element "RIM Transfer" has been set to the information element "Inter-system Information Transfer Type", and to transmit, to the UTRAN, the "eNB DIRECT INFORMATION TRANSFER" in which the second information element "SON information transfer for E-UTRAN-UTRAN" has been set to the information element "Inter-system Information Transfer Type"; wherein the type of the first radio information which can be set in the first information element "RIM Transfer" and the type of the second radio information which can be set in the second information element "SON information transfer for E-UTRAN-UTRAN" can be changed separately.

In the first characteristic of the present embodiment, the second radio information may include at least one of: information involved in mobility load balancing, information involved in mobility robustness optimization, or information involved in energy saving.

A second characteristic of the present embodiment summarized in that a radio network controller RNC located within UTRAN (a second radio access system), the radio network controller RNC being provided with: a generation unit 12 configured to generate "DIRECT INFORMATION TRANSFER (a message for information transfer)" including an information element "Inter-system Information Transfer Type" to which either one of a first information element "RIM Transfer" including first radio information requested in GERAN (a first radio access system) and a first forwarding address destined for the GERAN, or a second information element "SON information transfer for E-UTRAN-UTRAN" including a second radio information requested in E-UTRAN and a second forwarding address destined for the E-UTRAN can be set; and a transmission unit 13 configured to transmit, to the GERAN, the "DIRECT INFORMATION TRANSFER" in which the first information element "RIM Transfer" has been set to the information element "Inter-system Information Transfer Type", and to transmit, to the E-UTRAN, the "DIRECT INFORMATION TRANSFER" in which the second information element "SON information transfer for E-UTRAN-UTRAN" has been set to the information element "Inter-system Information Transfer Type"; wherein the type of the first radio information which can be set in the first information element "RIM Transfer" and the type of the second radio information which can be set in the second information element "SON information transfer for E-UTRAN-UTRAN" can be changed separately.

In the second characteristic of the present embodiment, the second radio information may include at least one of: information involved in mobility load balancing, information involved in mobility robustness optimization, or information involved in energy saving.

It is noted that the operation of the above-described the radio base station eNB, the radio network controller RNC or mobile switching center MME/SGSN may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the radio base station eNB, the radio network controller RNC or mobile switching center MME/SGSN. Further, such a storage medium or a processor may be arranged, as a discrete component, in the radio base station eNB, the radio network controller RNC or mobile switching center MME/SGSN.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

INDUSTRIAL APPLICABILITY

As described above, in accordance with the present invention, it is possible to provide a radio base station and a radio network controller making it possible to exchange load information appropriately between E-UTRAN and UTRAN without the need to apply changes to the specification for GERAN.

REFERENCE SIGNS LIST eNB . . . Radio base station
RNC . . . Radio network controller
11 . . . Information acquisition unit
12 . . . Generation unit
13 . . . Transmission unit
14 . . . Reception unit

The invention claimed is:

1. A radio base station, located within E-UTRAN, comprising:
   a generation unit configured to generate a message for information transfer including:
   when transferring to GERAN:
   an information element to which either one of a first information element including first radio information requested in GERAN and a first forwarding address destined for the GERAN is set;
   when transferring to E-UTRAN:
   a second information element including second radio information requested in E-UTRAN and a second forwarding address destined for the E-UTRAN is set; and
   a transmission unit configured to transmit, to the GERAN, the message for information transfer in which the first information element has been set to the information element, and to transmit, to the UTRAN, the message for information transfer in which the second information element has been set to the information element wherein
   the type of the first radio information which can be set in the first information element and the type of the second radio information which can be set in the second information element can be changed separately.

2. The radio base station according to claim 1, wherein
   the message for information transfer is "eNB DIRECT INFORMATION TRANSFER"; and
   the information element is "Inter-system Information Transfer Type".

3. The radio base station according to claim 1, wherein the second radio information includes at least one of: information involved in mobility load balancing, information involved in mobility robustness optimization, or information involved in energy saving.

4. A radio network controller, located within UTRAN, comprising:
   a generation unit configured to generate a message for information transfer including:
   when transferring to GERAN:
   an information element to which either one of a first information element including first radio information requested in GERAN and a first forwarding address destined for the GERAN is set;
   when transferring to E-UTRAN:
   a second information element including second radio information requested in E-UTRAN and a second forwarding address destined for the E-UTRAN can be is set; and
   a transmission unit configured to transmit, to the GERAN, the message for information transfer in which the first information element has been set to the information element, and to transmit, to the E-UTRAN, the message for information transfer in which the second information element has been set to the information element wherein the type of the first radio information which can be set in the first information element and the type of the second radio information which can be set in the second information element can be changed separately.

5. The radio network controller according to claim 4, wherein the message for information transfer is "DIRECT INFORMATION TRANSFER", and the information element is "Inter-system Information Transfer Type".

6. The radio network controller according to claim 4, wherein the second radio information includes at least one of: information involved in mobility load balancing, information involved in mobility robustness optimization, or information involved in energy saving.

* * * * *